US011135827B2

(12) United States Patent
Huynh

(10) Patent No.: US 11,135,827 B2
(45) Date of Patent: Oct. 5, 2021

(54) PATTERNING A NANOFIBER FOREST

(71) Applicant: Lintec of America, Inc., Richardson, TX (US)

(72) Inventor: Chi Huynh, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 0 days.

(21) Appl. No.: 16/589,269

(22) Filed: Oct. 1, 2019

(65) Prior Publication Data
US 2020/0114638 A1    Apr. 16, 2020

Related U.S. Application Data

(60) Provisional application No. 62/744,436, filed on Oct. 11, 2018.

(51) Int. Cl.
| | |
|---|---|
| *B32B 38/10* | (2006.01) |
| *B32B 38/00* | (2006.01) |
| *B32B 7/12* | (2006.01) |
| *B32B 37/00* | (2006.01) |
| *B32B 37/12* | (2006.01) |
| *C01B 32/168* | (2017.01) |

(52) U.S. Cl.
CPC ........... *B32B 38/10* (2013.01); *B32B 7/12* (2013.01); *B32B 37/025* (2013.01); *B32B 37/1207* (2013.01); *B32B 38/0012* (2013.01); *C01B 32/168* (2017.08)

(58) Field of Classification Search
CPC ............... C01B 32/168; B32B 37/025; B22F 2302/403; B82Y 40/00
See application file for complete search history.

(56) References Cited

U.S. PATENT DOCUMENTS

| | | | |
|---|---|---|---|
| 7,067,328 B2 * | 6/2006 | Dubrow | ............ H01L 21/02381 |
| | | | 117/68 |
| 2006/0057290 A1 * | 3/2006 | Glatkowski | ............ B82Y 30/00 |
| | | | 427/256 |
| 2012/0021164 A1 * | 1/2012 | Sansom | .................. B29C 70/64 |
| | | | 428/95 |
| 2012/0321961 A1 * | 12/2012 | Yushin | .................. H01M 4/133 |
| | | | 429/231.8 |
| 2015/0368105 A1 * | 12/2015 | Wei | ....................... B32B 37/025 |
| | | | 156/80 |
| 2016/0145105 A1 * | 5/2016 | Inoue | ..................... B32B 9/007 |
| | | | 428/119 |

* cited by examiner

*Primary Examiner* — Carson Gross
(74) *Attorney, Agent, or Firm* — Greenblum & Bernstein, P.L.C.

(57) ABSTRACT

A nanofiber forest that includes a pattern or shape can be transferred to a substrate. The nanofiber forest can be configured to have any perimeter and/or internal shape or pattern using a stencil technique and/or using an engraving technique. This pattern can be transferred as a "negative image" of a corresponding pattern in a stencil or as a "positive image" by engraving the pattern directly into the nanofiber forest. For either type of pattern formation, the patterned nanofiber forest is transferred by applying a substrate to the pattern or to a nanofiber forest covered by a patterned stencil. Pressure is then applied causing the exposed surface of the nanofiber forest or pattern of nanofiber forest to adhere to the substrate.

9 Claims, 9 Drawing Sheets

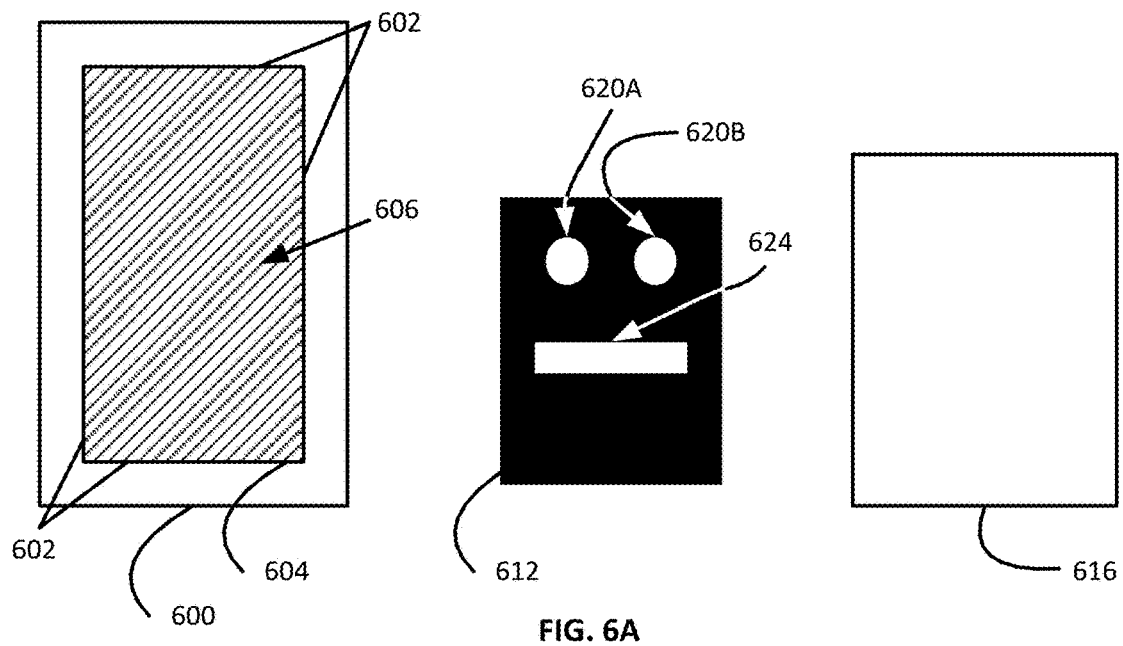
FIG. 6A
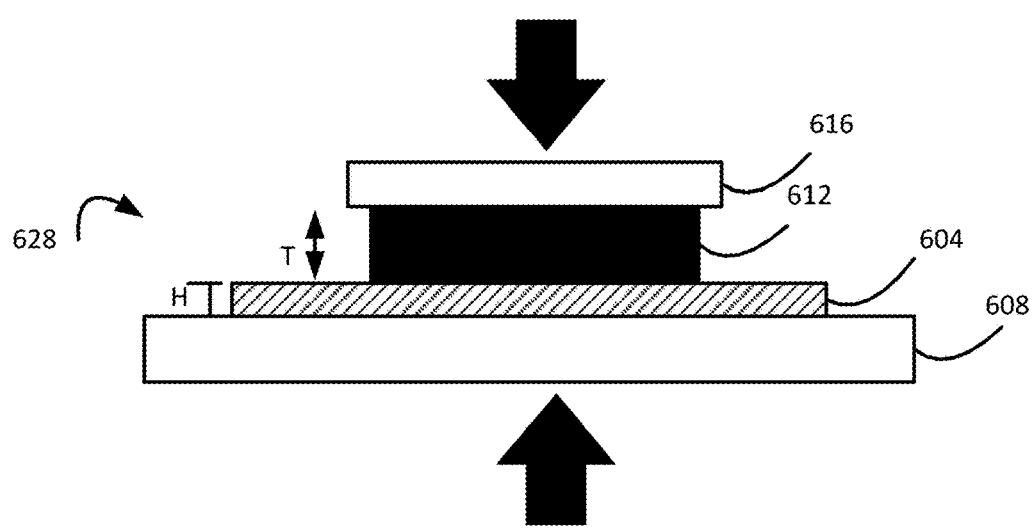
FIG. 6B
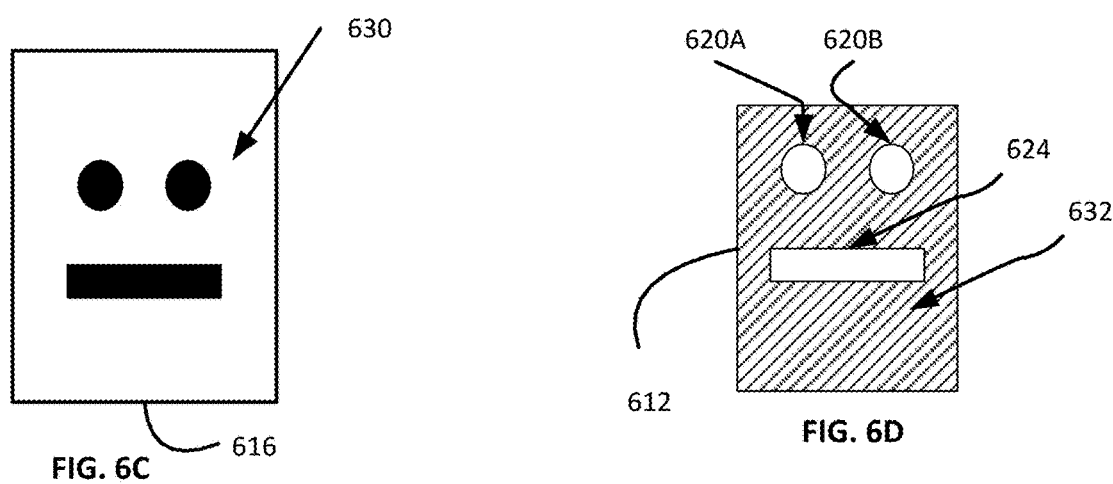
FIG. 6C
FIG. 6D

PATTERNING A NANOFIBER FOREST

TECHNICAL FIELD

The present disclosure relates generally to nanofibers. Specifically, the present disclosure relates to patterning a forest of nanofibers.

BACKGROUND

Nanofiber forests, composed of one or both of single wall and multiwalled nanotubes, can be drawn into nanofiber ribbons or sheets. In its pre-drawn state, the nanofiber forest comprises a layer (or several stacked layers) of nanofibers that are parallel to one another and perpendicular to a surface of a growth substrate. When drawn into a nanofiber sheet, the orientation of the nanofibers changes from perpendicular to parallel relative to the surface of the growth substrate. The nanotubes in the drawn nanofiber sheet connect to one another in an end-to-end configuration to form a continuous sheet in which a longitudinal axis of the nanofibers is parallel to a plane of the sheet (i.e., parallel to both of the first and second major surfaces of the nanofiber sheet).

SUMMARY

Example 1 is a method for patterning a nanofiber forest comprising: providing a nanofiber forest, a stencil, and a film, the stencil defining a first shape; placing the stencil between the nanofiber forest and the film to form a lamination stack; and compressing the lamination stack, the compressing encouraging contact between the nanofiber forest and the film through the first shape defined by the stencil.

Example 2 includes the subject matter of Example 1, wherein compressing the lamination stack transfers nanofibers corresponding to the first shape from the nanofiber forest to the film.

Example 3 includes the subject matter of either of Example 1 or Example 2, wherein a thickness of the stencil is in a range from approximately equal to a height of the nanofiber forest to 20% greater than the height of the nanofiber forest.

Example 4 includes the subject matter of any of the preceding Examples, wherein the film comprises silicone rubber.

Example 5 includes the subject matter of any of the preceding Examples, further comprising removing the film from the lamination stack, the removing exposing the film and nanofibers on the film in the first shape.

Example 6 includes the subject matter of any of the preceding Examples, further comprising placing the nanofibers on the film in the first shape in contact with a substrate, the contact transferring the nanofibers in the first shape to the substrate.

Example 7 includes the subject matter of any of the preceding Examples, further comprising: placing an adhesive layer on a thermal substrate; placing an exposed surface of the nanofibers in the first shape on the adhesive layer opposite the thermal substrate; removing the film; and heating the nanofibers in the first shape, the adhesive layer, and the thermal substrate.

Example 8 includes the subject matter of Example 7, wherein the heating converts the adhesive layer to a carbonized layer.

Example 9 includes the subject matter of Example 8, the heating comprises a temperature of 300° C. applied for 60 minutes; and responsive to the heating, the adhesive layer having a thickness of 5 µm is converted to the carbonized layer having a thickness of 500 nm.

Example 10 includes the subject matter of any of the preceding Examples, further comprising removing the stencil from the nanofiber forest, exposing the stencil and nanofibers on the stencil in a second shape that is complementary to the first shape.

Example 11 includes the subject matter of Example 10, further comprising placing the nanofibers on the stencil in the second shape in contact with a substrate, the contact transferring the nanofibers in the second shape to the substrate.

Example 12 is a method for patterning a nanofiber forest comprising: providing a nanofiber forest on a substrate; forming a pattern in the nanofiber forest on the substrate; placing a film in contact with a pattern formed in the nanofiber forest to form a lamination stack; and compressing the lamination stack.

Example 13 includes the subject matter of Example 12, wherein one or both of the placing or the compressing causes contact between the pattern in the nanofiber forest and the film.

Example 14 includes the subject matter of either of Example 12 or Example 13, wherein forming the pattern in the nanofiber forest on the substrate comprises compressing nanofibers of the nanofiber forest not within the pattern.

Example 15 includes the subject matter of any of Examples 12-14, wherein forming the pattern in the nanofiber forest on the substrate comprises removing nanofibers of the nanofiber forest not within the pattern from the substrate.

Example 16 includes the subject matter of any of Examples 12-15, wherein forming the pattern in the nanofiber forest on the substrate comprises exposing nanofibers of the nanofiber forest not within the pattern to a laser.

Example 17 includes the subject matter of any of Examples 12-16, further comprising separating the substrate from the film, the separating causing the pattern to adhere to the film.

Example 18 includes the subject matter of any of Examples 12-17, further comprising: placing an adhesive layer on a thermal substrate; placing an exposed surface of the nanofibers on the adhesive layer opposite the thermal substrate; removing the film; and heating the nanofibers in the pattern, the adhesive layer, and the thermal substrate.

Example 19 includes the subject matter of any of Examples 12-18, wherein the heating converts the adhesive layer to a carbonized layer.

Example 20 includes the subject matter of any of Examples 12-19, the heating comprises a temperature of 300° C. applied for 60 minutes; and responsive to the heating, the adhesive layer having a thickness of 5 µm is converted to the carbonized layer having a thickness of 500 nm.

BRIEF DESCRIPTION OF THE DRAWINGS

FIGS. 6A-6D illustrate various views corresponding to the example method depicted in FIG. 5, in an example of the present disclosure.

Figure 1:
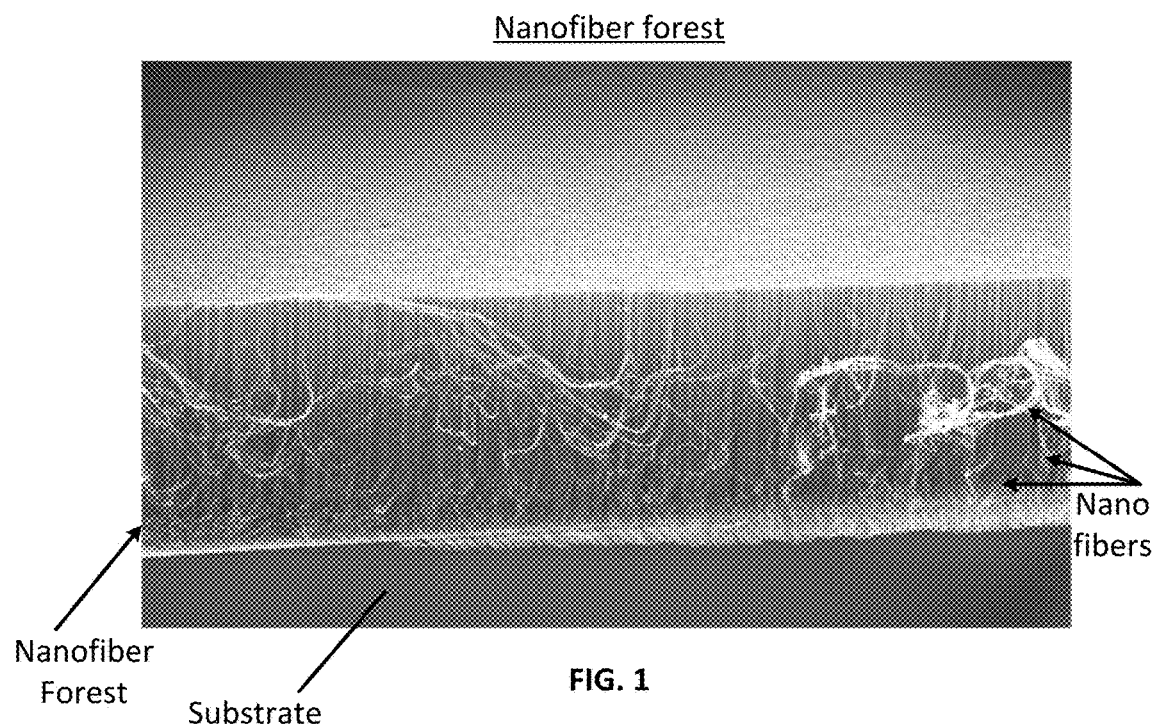
FIG. 1 illustrates an example forest of nanofibers on a substrate, in an example of the present disclosure.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

Nanofibers, and in particular carbon nanofibers, are of scientific and industrial interest. Nanofiber dispersions, nanofiber yarns, nanofiber composites, and nanofiber sheets have been the subject of study because, in part, their respective form factors easily lend themselves to industrial applicability. For example, nanofiber dispersions and nanofiber composites (e.g., nanofibers distributed within a polymer matrix) are in some ways analogous to other types of dispersions and composites. However, replacing a conventional colloid (e.g., silicates) in a suspension with nanofibers or replacing a conventional filler (e.g., silica beads, carbon black) in a polymer matrix with nanofibers can produce a suspension or a composite with different properties relative to the conventionally filled analogs. This improved material can provide benefits and be substituted (e.g., within a device or assembly with additional components) for its conventional predecessor.

A nanofiber forest, which is an array of billions of parallel nanofibers arranged perpendicular to a substrate, does not have an obvious conventional analog. Therefore, despite their convenient production, nanofiber forests have fewer applications in which they can be substituted for a pre-existing material.

Nevertheless, nanofiber forests share many of the advantageous thermal, electrical, chemical, and physical properties that make industrial application of carbon nanofiber suspensions, composites, yarns, and sheets compelling. For example, nanofiber forests can in some cases efficiently absorb a significant proportion of incident radiation (e.g., within the visible spectrum) and can also have an exceptionally high emissivity. For example, some carbon nanofiber forests (such as those described in U.S. Pat. No. 9,964,783) can have an absorbance of 99.96% of incident radiation having a wavelength of 650 nm, while other examples can have an emissivity at least 96% for infra-red (IR) radiation. In other examples, nanofiber forests can improve thermal conductivity across an interface by conforming to micron scale variations in surface topography on both sides of the interface and by having a high thermal conductivity.

In accordance with some embodiments of the present disclosure, techniques are described for configuring a nanofiber forest into any pattern or shape. In some examples, the nanofiber forest can be configured to have any perimeter and/or any internal (i.e., within a perimeter) pattern using a stencil technique. In other examples, the nanofiber forest can be configured to have any perimeter and/or any internal (i.e., within a perimeter) pattern using an engraving technique. Patterns and shapes thus formed can be transferred as a "negative image" of a corresponding pattern in a stencil. In a different technique, a pattern can also be transferred as a "positive image" by, for example, removing, flattening, or fusing nanofibers in the forest outside of the pattern. Only the nanofibers forming the pattern, and not the flattened nanofibers outside the pattern, will be transferred. Regardless of the technique employed, the patterned nanofiber forest is transferred by applying at least a substrate (referred to herein as a film) to the pattern with or without an intervening stencil. Pressure is then applied to the nanofiber forest in (direct or indirect) contact with the substrate, thus causing the exposed surface of the patterned nanofiber forest to adhere to the substrate.

In some embodiments, an adhesive layer (or other carbon containing layer) can be applied to a thermal substrate. A forest can then be placed in contact with the adhesive layer on the thermal substrate. The forest, adhesive layer, and thermal substrate are heated so as to combust volatile products in the adhesive. This transforms the adhesive to a "carbonized" layer. This carbonized layer can improve thermal conductivity between a nanofiber forest and an underlying heat source or heat sink (when compared to an adhesive) and/or act as a diffusion barrier that prevents the nanofiber forest from being contaminated (e.g., by a subsequently applied adhesive layer or other species capable of diffusion from a surface in contact with the forest).

Prior to describing the techniques for configuring the nanofiber forest to have any perimeter shape, nanofiber forests, sheets, yarns, and their corresponding fabrication techniques are first described.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified by application and subsequent removal of a solvent. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate and perpendicular to a surface of the substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
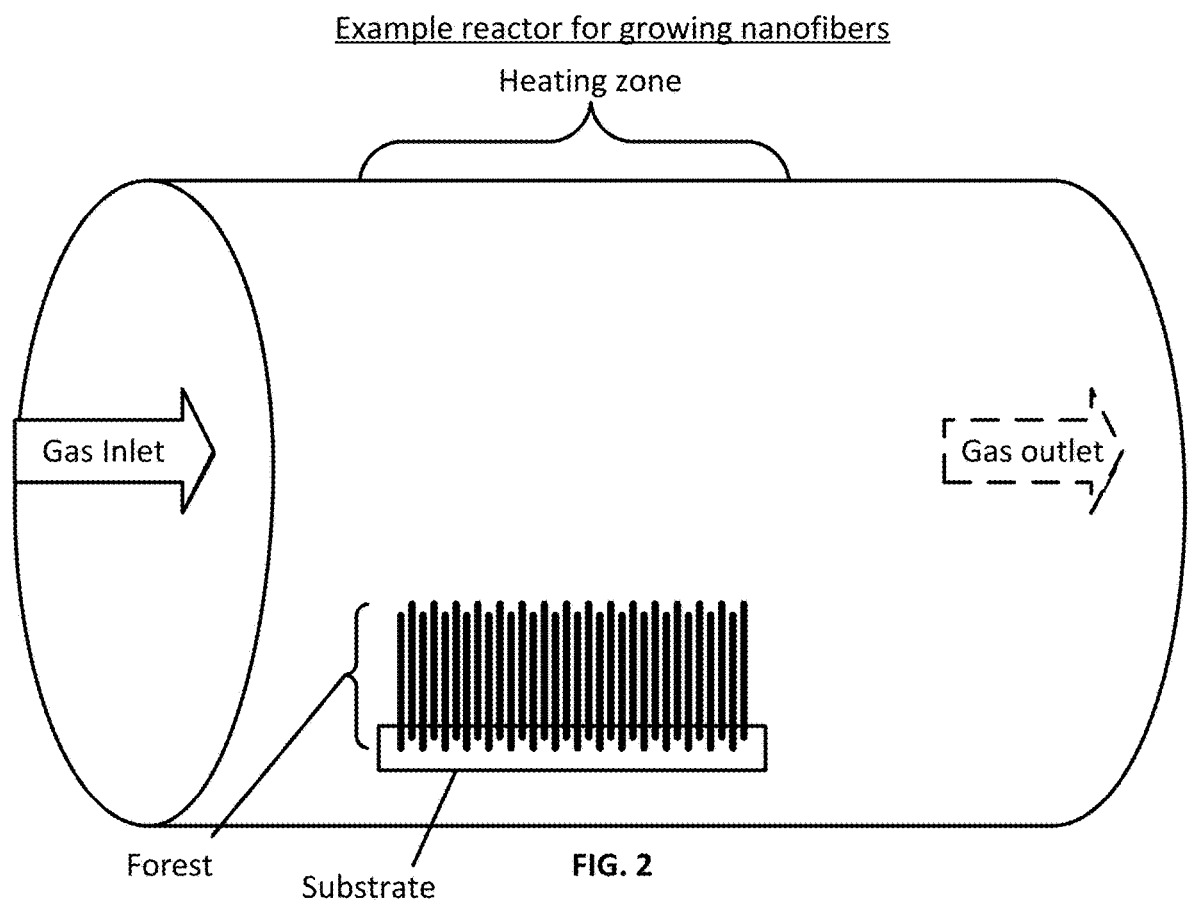
FIG. 2 is a schematic view of a furnace for the growth and synthesis of a nanofiber forest, in an example of the present disclosure.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO$_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
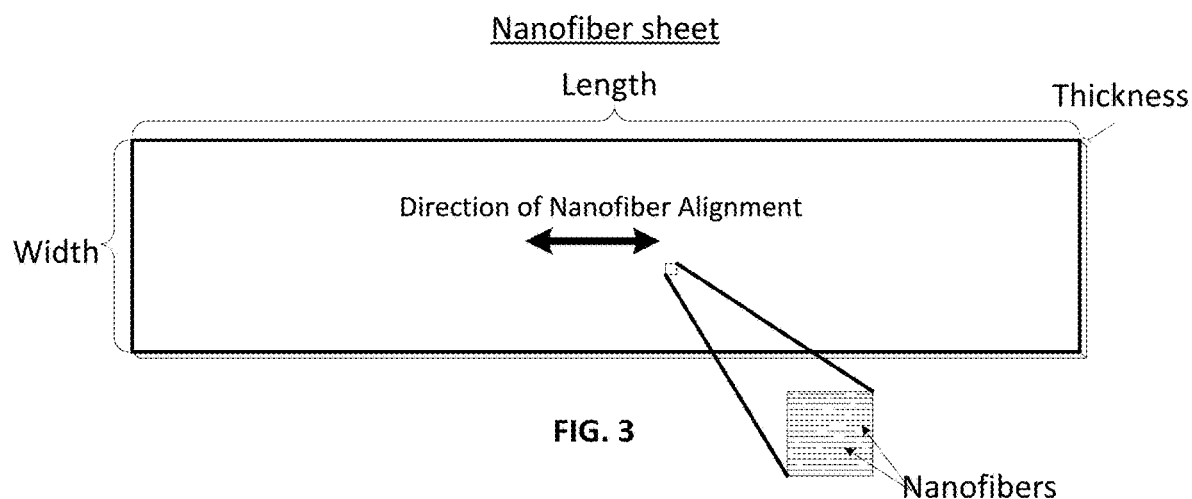
FIG. 3 is an illustration of a nanofiber sheet that identifies relative dimensions of the sheet and schematically illustrates nanofibers within the sheet aligned end-to-end in a plane parallel to a surface of the sheet, in an example of the present disclosure.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than 10$^3$, 10$^6$ or 10$^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
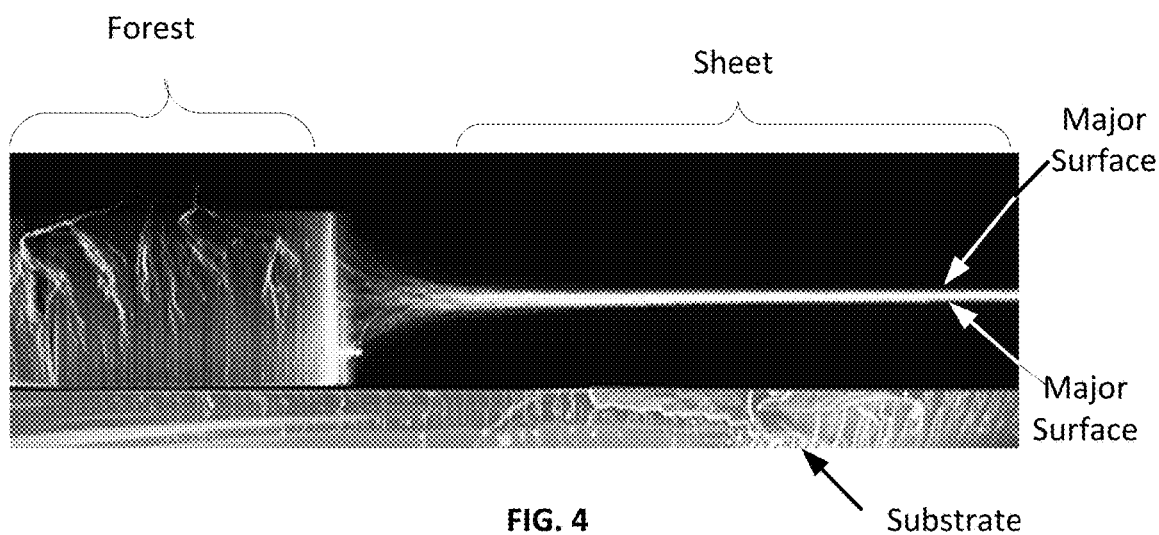
FIG. 4 is an image of a nanofiber sheet being laterally drawn from a nanofiber forest, the nanofibers aligning from end-to-end as schematically shown in FIG. 3.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon. These shapes can account for greater than 10%, greater than 20%, greater than 50% or greater than 75% of the total area of the stencil or forest.

EXAMPLE METHODS

As indicated above, techniques are described herein for configuring a nanofiber forest in any shape defining a perimeter of the nanofiber forest and/or any pattern within the perimeter of the forest. Example shapes include, but are not limited to circles, ellipses, squares, rectangles, regular polygons, irregular polygons, lines, and combinations thereof. In some examples, a nanofiber forest having any one or more of the preceding peripheral shapes may also include internal shapes such as areas of the nanofiber forest free of nanofibers that are in the shape of circles, ellipses, squares, rectangles, regular polygons, irregular polygons, and combinations thereof.

Figure 5:
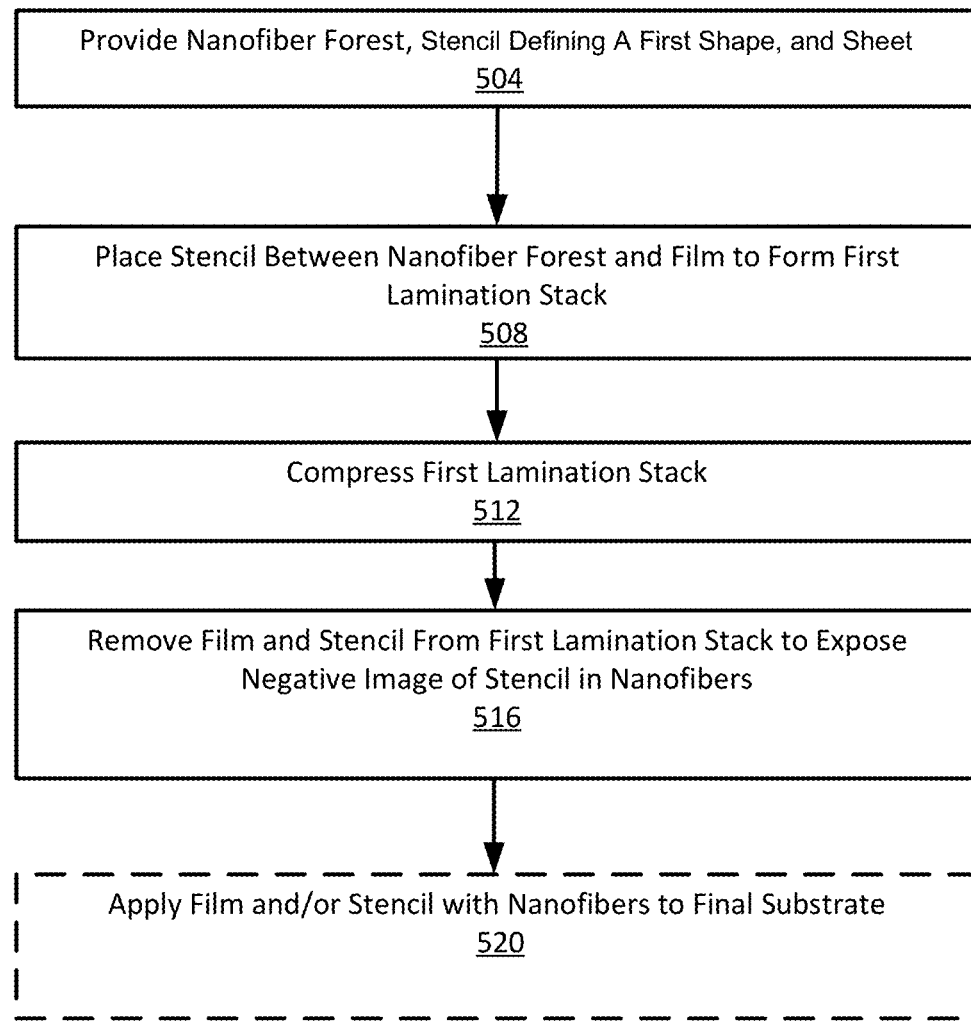
FIG. 5 is an example method for patterning a nanofiber forest, in an example of the present disclosure.

FIG. 5 illustrates a first example method 500 in which a stencil can be used to configure a nanofiber forest. FIGS. 6A-6D schematically illustrate structures corresponding to the performance of some of the stages of the method 500. The description primarily refers to configuration of an external periphery (or "perimeter") of the nanofiber forest, but this is merely for convenience. It will be appreciated that the techniques can be applied to configure a region of the nanofiber forest within a perimeter of another shape.

Referring to FIG. 5 and FIGS. 6A-6D, method 500 begins by providing 504 a nanofiber forest 604 on a substrate 600. The nanofiber forest has as external perimeter 602 ("perimeter" for brevity), which in turn defines an interior 606 of the nanofiber forest. A stencil 612 and a film 616 can also be provided 504.

The stencil 612 can define any type of shape (or shapes). The defined shape (or shapes) will be used to transfer some or all of the nanofiber forest to the film 616 in a pattern defined by the stencil shape(s). In the example shown, the stencil 612 is continuous except for cutouts (i.e., areas in an interior of the stencil which the stencil material is absent) that define circles 620A, 620B and rectangle 624. Portions of the nanofiber forest corresponding to a negative image of the cutouts (more generally areas of the stencil 612 defining gaps or other discontinuities in the stencil 612 material) will be transferred to the film 616 after performance of the method 500. It will be appreciated that other examples of the stencil 612 can be used to define a negative image of one or more irregular or regular polygons, circles, ellipses, lines or other shapes that will ultimately be transferred to the film 616.

In some examples, the stencil 612 has a thickness T (indicated in side view FIG. 6B) within any of the following ranges: from 10 µm to 500 µm; from 50 µm to 250 µm; from 75 µm to 125 µm; from 250 µm to 500 µm. More generally, the thickness T of the stencil 612 can be determined and selected based on a height H of a corresponding nanofiber forest 604. In some examples, the height H of the nanofiber forest 604 can be from 5 microns to 500 microns. For example, the thickness T of the stencil 612 can be selected to approximate the height H of the nanofiber forest 604 so that upon application of a compressive force (explained below) to a stack of the substrate 600, the forest 604, the stencil 612, and film 616, the ends of the nanofibers comprising the forest 604 are brought into contact with the film 616. In other examples, the thickness T of the stencil 612 is selected to be less (e.g. by 10% or by 20%) of the height H the nanofiber forest 604.

It will be appreciated that the contact between the forest 604 and the film 616 can be direct contact between these elements or can be indirect contact. Examples of indirect contact include contact via an intermediate layer such as an adhesive layer, a polymer layer, an intervening adhesive film with a polymer backing or without a polymer backing (the latter of which is sometimes referred to as a "non-carrier" adhesive), a solvent, and any combinations thereof. It will also be appreciated that the thickness T of the stencil 612 can be selected to also incorporate an expected amount of elastic or plastic deformation within the stencil 612 in response to the applied compressive force. In some examples the stencil can be compressed to less than 90%, less than 75% or less than 50% of its uncompressed thickness. In other cases, the stencil material can be selected to retain greater than 75%, greater than 90%, greater than 95% or greater than 99% when the system is subjected to pressure adequate to transfer the forest 604.

In some examples the stencil 612 can be fabricated from any type of cellulose fiber sheet (e.g., paper, cardboard, paper treated with a polymer or low surface energy layer (e.g., paraffin wax, polytetrafluoroethylene)). In some examples, the stencil 612 can be fabricated from a polymer sheet (e.g., polyethylene, polyethylene terephthalate, polypropylene, polytetrafluoroethylene), or a metallic sheet (e.g., aluminum, copper, steel, gold). More generally, the stencil 612 can be fabricated from any material that will have a greater adhesive strength with the nanofibers of the forest 604 than that between the nanofibers of the forest 604 and the substrate 600 (e.g., greater than 0.1 N/25 mm; greater than 1 N/25 mm) and that is able to maintain its shape during performance of the method 500. In particular, the stencil 612 can maintain its shape during a compression process used to transfer a portion of the nanofiber forest from the substrate 600 to the film 616.

In some examples the film 616 can be fabricated from silicone rubber. While examples of the film 616 are not limited to silicone rubber, the selection of silicone rubber does have a number of advantages. For example, nanofibers from the forest 604 can conveniently adhere to a film 616 fabricated from silicone rubber without an intervening adhesive. This has the benefit of avoiding diffusion of adhesive molecules into the forest 604 (i.e., between individual nanofibers of the forest 604) and/or into hollow nanofibers themselves.) Also, silicone rubber is chemically stable and will itself not degrade upon exposure to the nanofibers. Silicone rubber is also compliant, and thus can deform when compressed so as to facilitate physical contact between the film 616 and the nanofibers of the forest 604 that are disposed on an opposite side of the stencil 612 from the film 616. Furthermore, a film 616 that is fabricated from silicone rubber is able to withstand high compressive forces without fracturing.

It will be appreciated that the film 616 is not limited to being fabricated from silicone rubber. Rather any number of materials can be used for the film 616 selected with the foregoing considerations. Examples of other materials that can be used for the film 616 include, but are not limited to, polyethylene, polypropylene, nylon 6,6, as well as cellulosic fiber sheets, natural fiber fabrics, any one or more of which may optionally be treated or coated with an adhesive (e.g., pressure sensitive adhesive). Any of the materials described above in the context of the stencil 612 can be used to fabricate the film 616.

Continuing with the method 500, the stencil 612 is placed 508 between the nanofiber forest 604 and the film 616. For convenience of description, this configuration (illustrated in FIG. 6B) is referred to as a first lamination stack 628.

The first lamination stack 628 is compressed 512, as indicated by arrows in FIG. 6B. Compression 512 of the first lamination stack 628 has the effect of causing contact between the film 616 and at least the ends of the fibers of the nanofiber forest 604 that are not covered by the stencil 612 (in this example, the portions of the nanofiber forest 604 left exposed by cutouts of circles 620A, 620B and rectangle 624 defined by the continuous portions of the stencil 612). The pattern of the forest 604 corresponding to the cutouts in the stencil 612 is referred to as a "negative image" of the stencil.

The entire lamination stack 628 can be compressed at the same time or different portions of the stack can be compressed sequentially. In one example, compression 512 of the first lamination stack 628 can be performed using a commercially available laminating machine. These machines are generally configured to include two confronting rollers attached to a frame. Other types of presses can be used to apply pressure to the lamination stack 628. Commercial laminators and presses can apply between 50 psi and 50,000 psi. Depending on the height H of the nanofiber forest 604, the thickness T of the stencil 612, and the thickness and compressive elastic modulus (compliance) of the film 616, pressures that can be applied according to the method 500 can be within any of the following ranges: from 50 psi to 50,000 psi; from 50 psi to 1000 psi; from 1000 psi to 10,000 psi; from 10,000 psi to 50,000 psi.

As shown in FIG. 6C, the effect of compressing 512 the first lamination stack 628 is to transfer nanofibers in a "negative image" 630 of the pattern defined by the stencil 612 to the film 616. Upon removing 516 the film 616 and the stencil 612 from the forest 604/substrate 608, a negative image 630 is exposed on the film 616. A portion 632 of the nanofiber forest 604 may also adhere to the stencil 612, as shown in FIG. 6D. It will be appreciated that in some cases the nanofiber forest need not be transferred to the stencil.

Optionally, the method 500 may continue by applying 520 the stencil 612 and/or film 616 containing portions of the forest 604 to a final substrate (not shown). Examples of the final substrate can include adhesive sheets or other substrates on which a nanofiber forest can adhere.

FIGS. 7, 8A, 8B, 8C illustrate an alternative to the method 500 described above. Whereas the method 500 uses a stencil 612 to transfer some of the nanofiber forest 604 onto the stencil 612 while simultaneously creating a negative image 630 of the stencil 612, the alternative example method 700 (illustrated in FIGS. 8A-8D) instead forms a positive image of a pattern 816 that is then transferred. This positive image is formed in the forest itself and subsequently enables transferring the positive image to a final substrate by compressing the film 616 depicted in FIG. 6D to another film or substrate (not shown).

Figure 7:
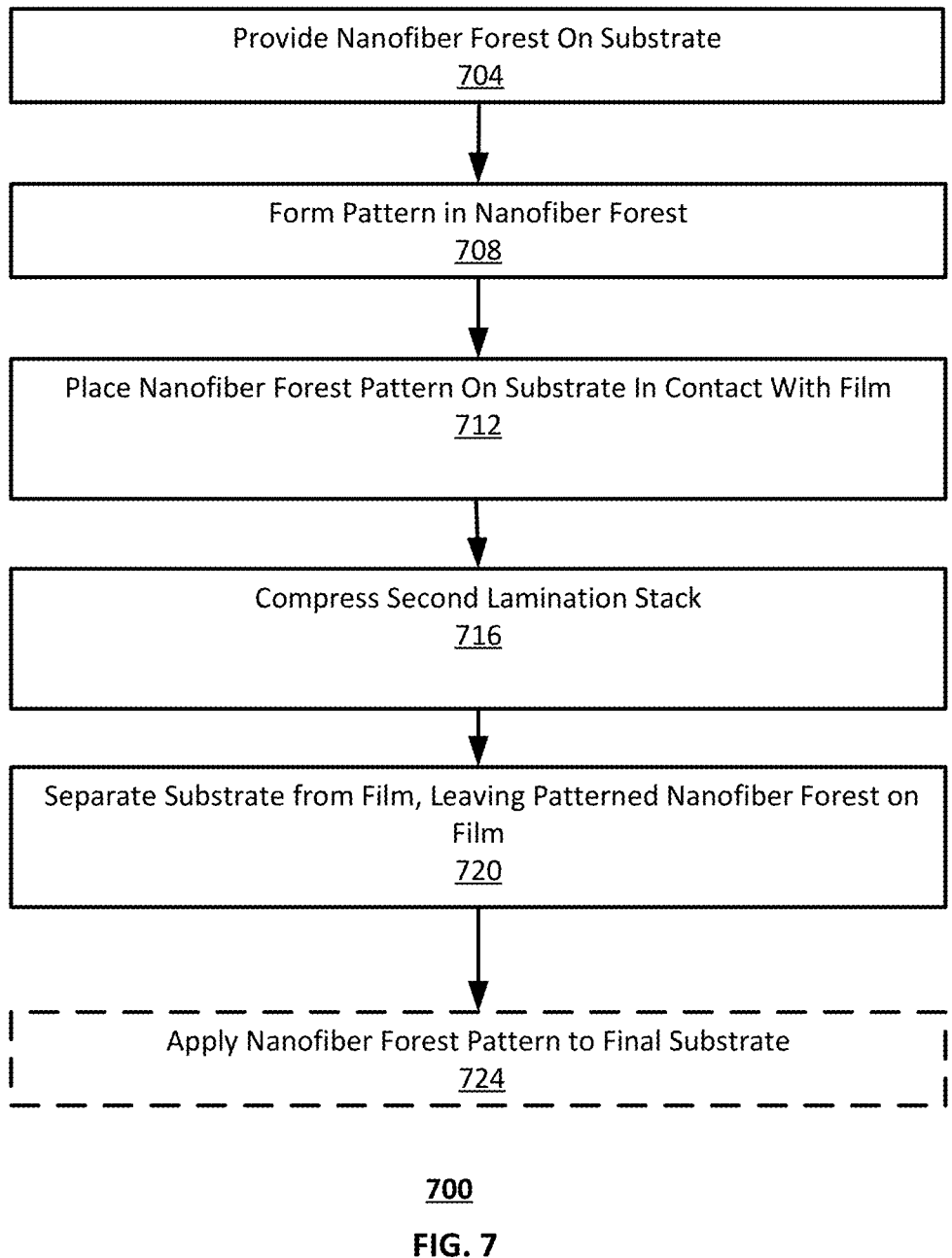
FIG. 7 is another example method for patterning a nanofiber forest, in an example of the present disclosure.
Figure 8A:
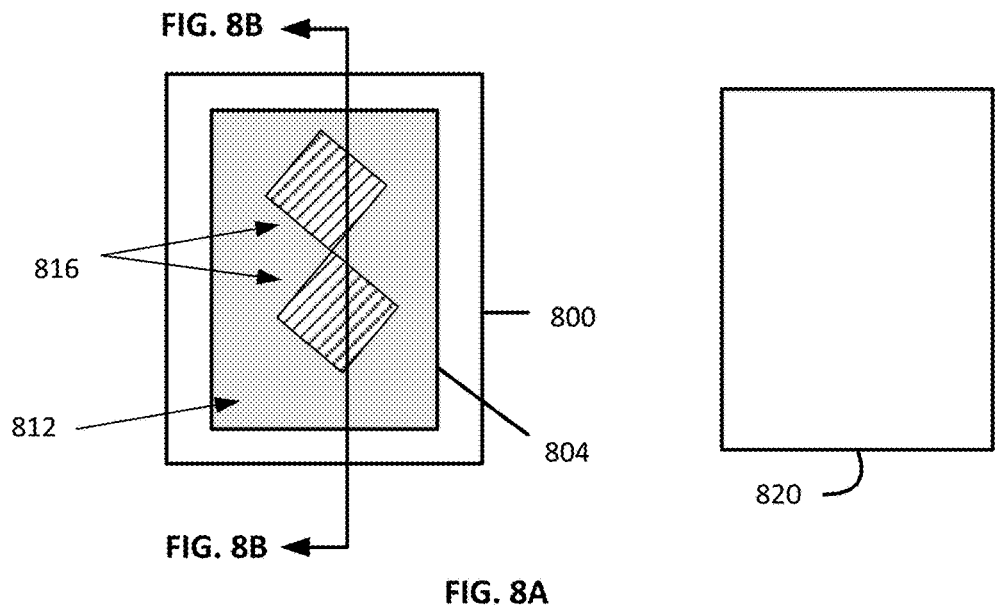
FIGS. 8A-8C illustrate various views corresponding to the example method depicted in FIG. 7, in an example of the present disclosure.

The method 700 depicted in FIG. 7 (sometimes referred to as an "engraving" technique) begins by providing 704 a nanofiber forest 804 on a substrate 800. The substrate 800 and the nanofiber forest 804 are analogous to those described above in the method 500 and the descriptions in the context of FIGS. 1-4. As shown in FIG. 8A, a pattern 816 can be formed 708 in the nanofiber forest 804 while still on the substrate 800. In this example method 700, the pattern 816 (in this case, two tangentially touching squares) is formed by causing nanofibers of the forest 804 not within the pattern to be less likely to transfer to another substrate or film. In some examples, the pattern 816 is formed 708 by compressing the nanofibers of the forest 804 outside the pattern 816 so as to flatten them against the substrate 800. The non-transferable nanofibers 812 (a negative image of the pattern 816) is indicated by a shaded region in FIG. 8A.

Another example by which the pattern 816 can be formed includes removing nanofibers of the forest 804 not within the pattern 816 from the substrate 800 entirely (e.g., by scraping, cutting, pulling, and/or heating). In still another example by which the pattern 816 can be formed is by exposing nanofibers of the forest 804 not within the pattern 816 to a laser so as to shorten, damage, vaporize, or fuse individual nanofibers together to decrease their ability to transfer to another sheet or substrate. In another example, a patterned roller or patterned sheet can be used to "emboss" a desired pattern 816 to the nanofiber forest by compressing or dislodging nanofibers of the forest 804 not within the pattern 816, thus preventing their transfer as described below.

A film (equivalently "substrate") 820 can then be placed 712 on the pattern 816 so as to dispose the pattern 816 and the non-transferrable (e.g., flattened, fused, or removed) nanofiber forest 812 between the substrate 800 and the film 820. The film 820 is analogous to the film 616 described above in the context of the method 500 and needs no further description. Placement 712 of the film 820 on the nanofiber forest 804 and the substrate 800 forms a second lamination stack 822.

Figure 8B:
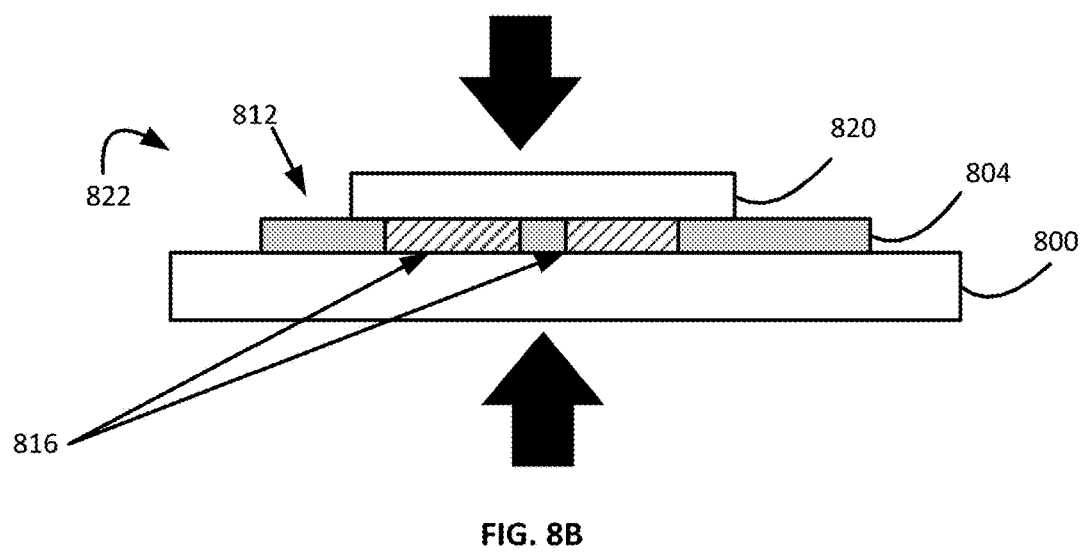
Figure 8C:
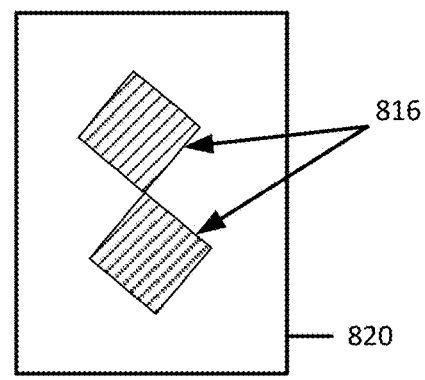

As shown in FIG. 8B, and indicated by the arrows, the second lamination stack 822 is then compressed 716 using techniques described above in the context of compression of the first lamination stack of the method 500. This compression 716 transfers the pattern 816 to the film 820. Separating 720 the film 820 from the other elements of the second lamination stack 822 will thus expose the pattern 816 now attached to the film 820. This is shown in FIG. 8C.

In one example, the non-patterned portion(s) 812 remain on the substrate 800 and can be re-oriented to be perpendicular to the substrate 800. This can be accomplished by applying an adhesive sheet to the flattened nanofibers where the adhesive strength to the nanofibers is less than the adhesive strength between the nanofibers and the substrate 800. Upon removing the adhesive sheet, the nanofibers are re-oriented relative to, but not removed from, the substrate 800. This newly perpendicular nanofiber forest can be patterned again or simply used in the method 700 by placing 712 this forest in contact with a film and performing the remaining elements of the method 700. As described above, the pattern 816 can then be optionally applied 724 to a final substrate (not shown).

Carbonized Layer

Figure 9:
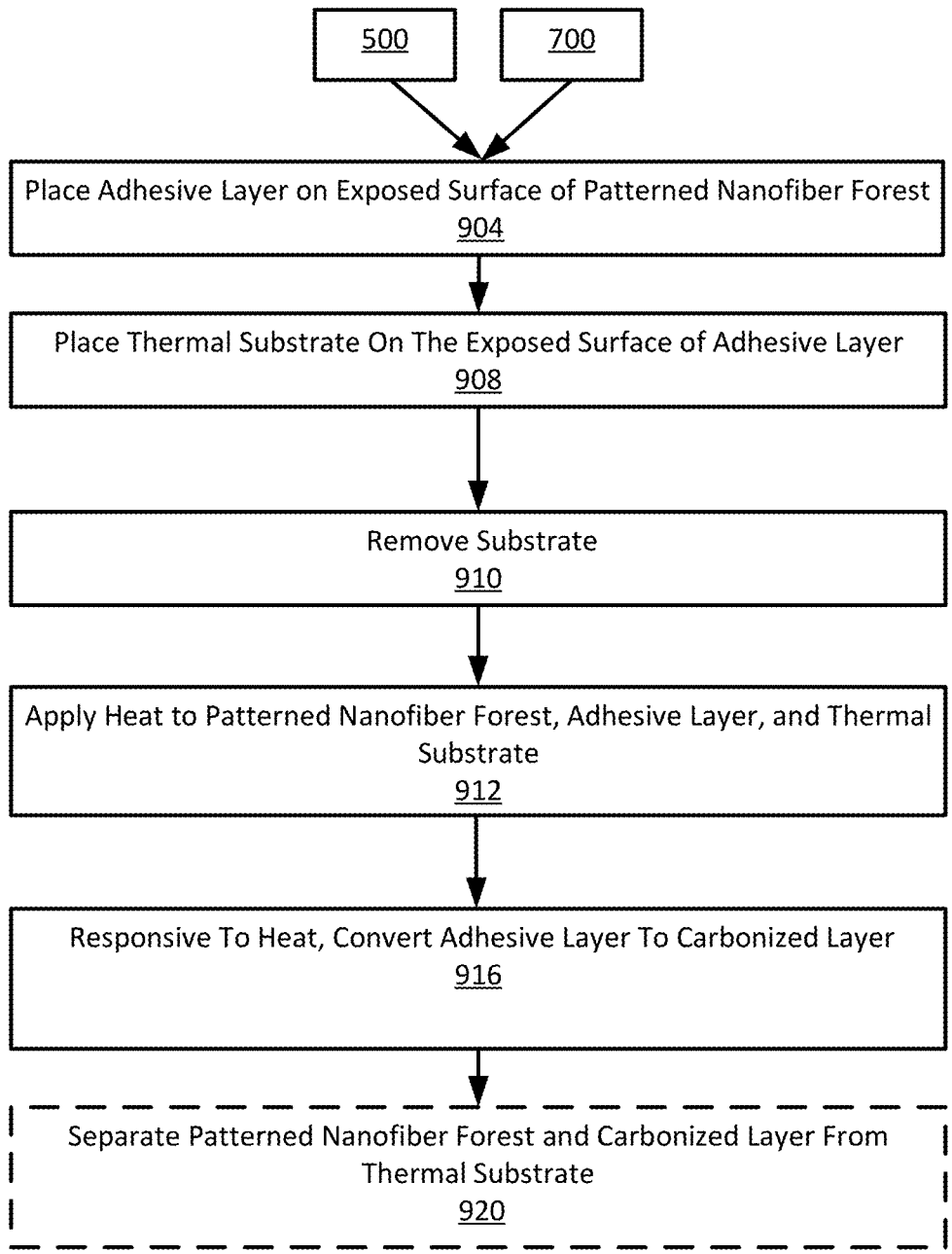
FIG. 9 is an example method for fabricating a carbonized layer on a patterned nanofiber forest, in an example of the present disclosure.
Figure 10A:
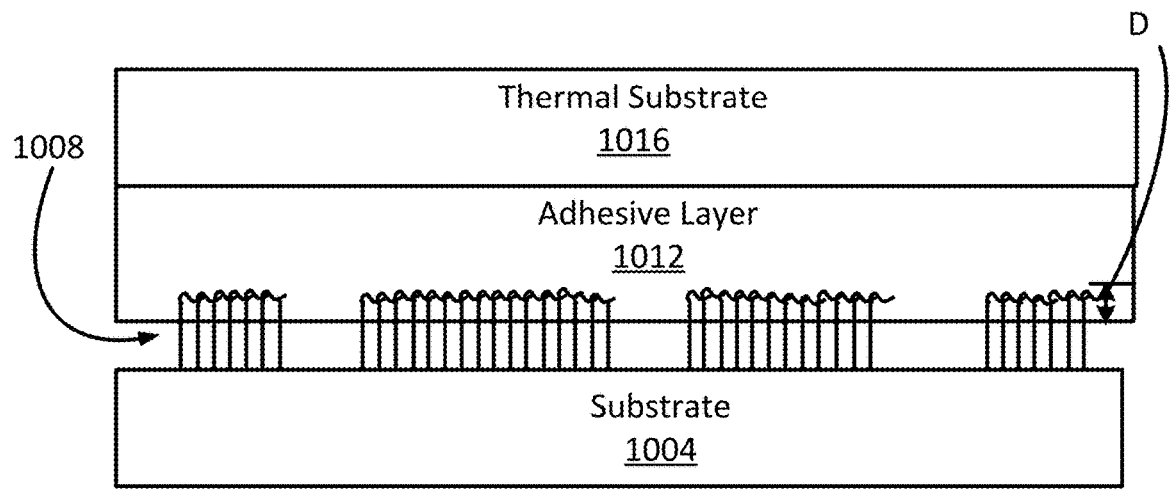
FIGS. 10A and 10B are schematic illustrations of a carbonized layer formed on a patterned nanofiber forest, in an example of the present disclosure.
Figure 10B:
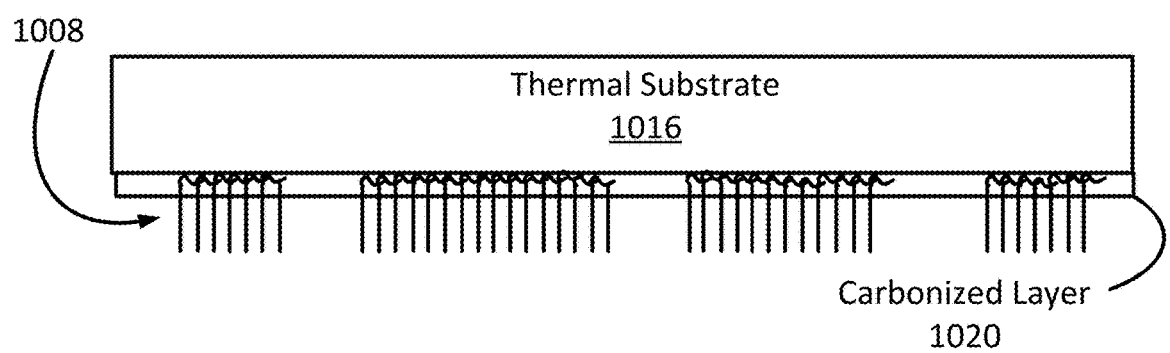

In one variation, either one of the methods 500 and/or 700 can be complimented by the addition of an example method 900. The example method 900, illustrated in FIG. 9, is a technique by which an adhesive layer (or other carbon containing layer) is applied to a thermal substrate before the application of a patterned nanofiber forest and then "carbonized." This can bond the thermal substrate and the patterned forest together while avoiding diffusion of adhesive into the forest that generally occurs with an adhesive (e.g., that is composed of molecules that can diffuse or migrate at ambient temperatures). In some examples, the presence of a carbonized layer can increase thermal conductivity of a forest (by, for example, with an underlying heat source in contact with the forest) by as much as 50% in comparison to the use of an adhesive layer. Illustrative structures produced at various stages by the example method 900 are illustrated in FIGS. 10A and 10B. Concurrent references to FIGS. 9, 10A, and 10B will facilitate explanation.

The method 900 can be started by placing 904 an adhesive layer 1012 on the thermal substrate 1016. Examples of adhesives for the adhesive layer 1012 include, but are not limited to, pressure sensitive adhesives, thermally activated adhesives, and adhesive layers used for "non-carrier" adhesives (e.g., self-supporting adhesive sheets that lack a polymer backing). In some examples, the average thickness of the adhesive layer can be within any of the following ranges: greater than 5 μm, from 5 μm to 20 μm; from 5 μm to 30 μm; from 5 μm to 10 μm; from 10 μm to 25 μm, less than 100 μm, less than 50 μm or less than 25 μm.

The exposed surface of a patterned nanofiber forest 1008 on a substrate (or "film") 1004 produced from one or both of the methods 500, 700 is then applied 908 to the thermal substrate 1016, as shown in FIG. 10A. The thermal substrate 1016 includes a material capable of being heated at temperatures from 250° C. to 500° C. for at least two hours while remaining structurally unchanged and chemically inert. Examples of the thermal substrate 1016 include silica (including quartz), silicon, borosilicate glass, alumina, zirconia, steel, aluminum, among others. It will be appreciated that the adhesive layer 1012 can also be applied 904 to the patterned nanofiber forest 1008, both of which can then be placed 908 on the thermal substrate 1016.

The substrate 1004 (e.g., the film from the methods 500, 700) can then be removed 910. Heat is then applied 912 to the patterned nanofiber forest 1008, the thermal substrate 1016, and the adhesive layer 1012 therebetween. In some examples, the applied 912 heat corresponds to a temperature of 300° C. (+/−5° C. within normal variation and measurement error) from 30 minutes to 240 minutes. The adhesive layer 1012 can be heated 912 in air, vacuum, an inert atmosphere (e.g., argon, nitrogen), or combinations thereof.

The applied 912 heat causes at least some of the non-organic, volatile, decomposable, and/or combustible components of the adhesive layer 1012 to be removed from the adhesive layer 1012, thus converting (or combusting or partially combusting) 916 the adhesive layer 1012 to the carbonized layer 1020. That is, the applied 912 heat converts the adhesive layer 1012 to a layer predominantly (e.g., greater than 50 molar %) composed of carbon. In some examples, some molecules of adhesive or portions of adhesive molecules may remain in a non-carbonized or partially carbonized form. This is illustrated in FIG. 10B.

In one experimental example, the applied 912 heat was applied at 300° C. for 120 minutes to a 5 μm thick adhesive layer 1012 in an air atmosphere. This reduced the adhesive layer to less than 1000 nm thick, and more specifically to about 500 nm thick, after about 60 minutes of heating.

The patterned nanofiber forest 1008 and the carbonized layer 1020 may optionally be separated 920 from the thermal substrate 1016. One technique for accomplishing this is by attaching an additional substrate and additional adhesive layer having an adhesive strength greater than that between the carbonized adhesive 1020 and the thermal substrate 1016. For example, the adhesive strength between the thermal substrate 1016 and the patterned nanofiber forest 1008 can be about 0.1 N/25 mm (+/−10%, when measured using a 180° peel adhesion test (sold by CHEMINSTRUMENTS® of West Chester, Ohio)). The additional adhesive layer (not shown) can have an adhesive strength greater than these values, and in particular, greater than 2 N/25 mm.

Nanofiber Orientation

For any of the examples described above, in the context of any of methods 500, 700, and/or 900, the orientation of the nanofibers of the forest can be either "open ends" at the exposed surface of the forest or "tangled ends" at the exposed surface of the forest. Multiple transfers can result in nanofiber images on the film or other substrate that include portions exposing open ends and other portions exposing tangled ends. Different portions on a film may exhibit other varying characteristics as well, including different forest heights, differing forest densities, and different nanotube chemical (e.g., doped) or physical (e.g., number of walls) composition.

When formed, nanofibers in the nanofiber forest (and the nanofiber forest collectively) can be considered to have three portions: an open end, a tangled or "closed" end, and a straight portion therebetween. Generally, the open end is the end of a nanofiber that is proximate to a growth substrate and the tangled end is at the exposed surface of the synthesized forest.

The orientation of the forest can be reversed in any of the preceding examples by applying a first adhesive substrate to an exposed surface of the as-grown forest, where the first adhesive substrate has a first adhesive strength greater than that of between the nanofiber forest and a growth substrate. In some examples, this can be from 2 N/25 mm to 4 N/25 mm when pulled at a rate of 5 mm/second. Removing the first adhesive substrate from the growth substrate will expose the open ends of the nanofiber forest. This "flipping" technique can be performed before or after processing according to one or more of the methods 500, 700, and/or 900. The nanofiber forest can optionally be re-oriented before or after performance of any one or more of the methods 500, 700, and/or 900 by attaching a second adhesive substrate to the exposed "open" ends of the nanofiber forest having a second adhesive strength greater than that of the first adhesive strength. The second adhesive substrate can then be used to separate the nanofiber forest from the first adhesive substrate. This process is described in U.S. Pat. No. 9,964,783, which incorporated by reference herein in its entirety.

EXPERIMENTAL EXAMPLES

Figure 11A:
FIGS. 11A and 11B are example structures produced by one or more of the example methods illustrated in FIGS. 5 and 7, in examples of the present disclosure.
Figure 11B:
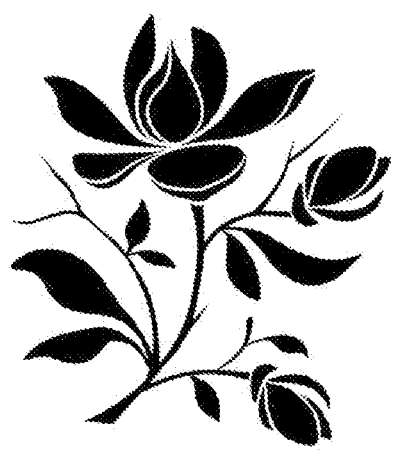

FIGS. 11A and 11B are example structures produced by one or more of the example methods illustrated in FIGS. 5 and 7, in examples of the present disclosure Further Considerations The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for patterning a nanofiber forest comprising:
providing a nanofiber forest on a substrate;
forming a pattern in the nanofiber forest on the substrate, such that a first group of nanofibers in the nanofiber forest is flattened to be shorter than a second group of nanofibers in the nanofiber forest;
placing a film in contact with only the second group of nanofibers within the nanofiber forest to form a lamination stack;
compressing the lamination stack; and
separating the substrate from the film, such that the second group of nanofibers is transferred to the film while the substrate retains the first group of nanofibers.

2. The method of claim 1, wherein one or both of the placing or the compressing causes contact between the pattern in the nanofiber forest and the film.

3. The method of claim 1, wherein forming the pattern in the nanofiber forest on the substrate comprises compressing nanofibers of the nanofiber forest not within the pattern.

4. The method of claim 1, wherein forming the pattern in the nanofiber forest on the substrate comprises removing nanofibers of the nanofiber forest not within the pattern from the substrate.

5. The method of claim 1, wherein the forming of the pattern in the nanofiber forest on the substrate comprises exposing nanofibers of the nanofiber forest not within the pattern to a laser.

6. The method of claim 1, wherein the separating of the substrate from the film causes the second group of nanofibers of the pattern to adhere to the film.

7. The method of claim 6, further comprising:
placing an adhesive layer on a thermal substrate;
placing an exposed surface of the second group of nanofibers on the adhesive layer opposite the thermal substrate;
removing the film; and
heating the first group of nanofibers in the pattern, the adhesive layer, and the thermal substrate.

8. The method of claim 7, wherein the heating converts the adhesive layer to a carbonized layer.

9. The method of claim 8, wherein:
the heating comprises a temperature of 300° C. applied for 60 minutes; and
responsive to the heating, the adhesive layer having a thickness of 5 µm is converted to the carbonized layer having a thickness of 500 nm.

* * * * *